United States Patent [19]

Kiang

[11] Patent Number: 5,336,721
[45] Date of Patent: Aug. 9, 1994

[54] ADHESIVE BLENDS OF ETHYLENE-ALKYL ACRYLATE COPOLYMERS AND MODIFIED PROPYLENE-ETHYLENE COPOLYMERS

[75] Inventor: Webster W. Kiang, West Chester, Ohio

[73] Assignee: Quantum Chemical Corporation, Cincinnati, Ohio

[21] Appl. No.: 46,251

[22] Filed: Apr. 6, 1993

[51] Int. Cl.$^5$ .............................................. C08L 33/02
[52] U.S. Cl. .................................... 525/78; 525/85; 525/227
[58] Field of Search ........................... 525/78, 85, 227

[56] References Cited

U.S. PATENT DOCUMENTS

| | | |
|---|---|---|
| 2,200,429 | 5/1940 | Perrin et al. . |
| 4,230,830 | 10/1980 | Tanny et al. ................ 525/78 X |
| B1 4,230,830 | 5/1990 | Tanny et al. ................ 525/78 X |
| 4,487,885 | 12/1984 | Adur et al. ..................... 525/78 |
| 4,774,144 | 9/1988 | Jachec ............................ 525/78 X |
| 4,957,968 | 9/1990 | Adur et al. .................... 525/78 X |
| 4,983,435 | 1/1991 | Ueki et al. ..................... 525/78 X |
| 5,002,833 | 3/1991 | Kinsey et al. . |
| 5,025,057 | 6/1991 | Shigemoto . |
| 5,053,457 | 10/1991 | Lee ..................................... 525/78 |
| 5,055,526 | 10/1991 | Sato et al. ...................... 525/78 X |
| 5,077,123 | 12/1991 | Shigemoto . |
| 5,106,692 | 4/1992 | Shigemoto . |
| 5,198,494 | 3/1993 | Kawachi et al. ............ 525/78 X |
| 5,202,192 | 4/1993 | Hope et al. ................... 525/78 X |

FOREIGN PATENT DOCUMENTS 64-53838  3/1989  Japan .
64-55240  3/1989  Japan .

*Primary Examiner*—Daniel Zirker
*Attorney, Agent, or Firm*—Gerald A. Baracka; William A. Heidrich

[57] ABSTRACT

Improved two-component blends which exhibit good adhesion to 4-methylpentene-1 polymers and vinyl alcohol polymers and which may be used as an adhesive interlayer when laminating layers of the polymers are provided. Ethylene-alkyl acrylate copolymers, preferably ethylene n-butyl acrylate copolymers, and modified propylene polymers, preferably maleic anhydride grafted statistical propylene-ethylene copolymers and propylene-ethylene impact copolymers, are combined to obtain the blends of the invention. Useful laminated structures comprised of a layer of poly-4-methylpentene-1 homopolymer or copolymer, a layer of the adhesive blend and a layer of ethylene-vinyl alcohol copolymer with one or more optional layers, such as a paperboard, are also disclosed.

13 Claims, No Drawings

ADHESIVE BLENDS OF ETHYLENE-ALKYL ACRYLATE COPOLYMERS AND MODIFIED PROPYLENE-ETHYLENE COPOLYMERS

BACKGROUND OF THE INVENTION

1. Field of the Invention

The present invention generally relates to extrudable adhesive blends and to composite structures incorporating these adhesive blends. Useful multi-layer structures of the invention comprise at least one layer of 4-methylpentene-1 polymer having a barrier layer of vinyl alcohol polymer on at least one side and an adhesive interlayer sandwiched therebetween.

2. Description of the Prior Art

Crystalline homopolymers and copolymers of 4-methylpentene-l(4MP1), generally referred to herein as polymethylpentenes (PMPs), are known and are commercially available. Whereas PMPs have mechanical properties comparable to other olefin polymers, such as polypropylene, their thermal properties are similar to engineering plastics. This combination of mechanical and thermal properties coupled with superior chemical resistance and high optical transparency makes PMPs a highly useful class of general purpose plastics. PMPs can be extruded to produce films, sheets and laminated structures—generally using the same processing equipment as employed for polyolefins but varying the operating conditions.

Owing to their superior properties and high melting and softening points, homopolymers and copolymers of 4MP1 are particularly well suited for the construction of laminated containers for use with heated food products. For example, coextruded laminates used to produce grease resistant dual ovenable paperboard based structures having a PMP food contact resin layer are disclosed in U.S. Pat. No. 5,002,833. The disclosed structures are suitable for use in both conventional and microwave ovens and two specific laminate structures are disclosed—the first comprising a paperboard substrate having a five-layer coating coextruded thereon (paperboard/PMP/tie/barrier/tie/PMP) and the second having a three-layer coating coextruded onto paperboard (paperboard/barrier/tie/PMP). The PMP resin layer imparts good grease and oil resistance, superior food release properties and resistance to warpage. Polyamides, copolyamides, polyesters and copolyesters are indicated to be useful barrier layers and the tie layer is a chemically modified graft copolymer of methylpentene.

Since ethylene-vinyl alcohol (EVOH) copolymers are highly effective barrier resins, it would be useful if composite structures comprised of one or more PMP layers with an EVOH barrier layer were available. The ability to produce such structures has, however, been restricted due to the limited availability of extrudable adhesives that can be interlayered between the PMP and EVOH and which have strong interfacial adhesion to both the PMP and the EVOH.

An adhesive blend suitable for laminating PMPs and thermoplastic resins, including EVOH, has been disclosed in U.S. Pat. No. 5,106,692. The blends are comprised of 40 to 98% by weight ethylene/α-olefin random copolymer containing 30 to 95 mole % ethylene units, 0.1 to 20% by weight polyolefin modified with an unsaturated carboxylic acid or its acid halide, amide, imide or anhydride, and 1 to 50% by weight tackifier. Tackifiers used for the blends are typically hydrocarbon resins produced from various fractions obtained from petroleum and naphtha cracking operations.

While the three-component adhesive blends of U.S. Pat. No. 5,106,692 can be used to effectively adhere PMP to EVOH, it would be highly desirable if other adhesives were available for this purpose. It would be advantageous if the adhesive blends utilized fewer than three components since this would simplify the blending operation and minimize the opportunity for error. Also, processors who formulate their own adhesive blends could inventory fewer materials. It would be even more advantageous if the adhesive blends did not require use of a hydrocarbon resin tackifier since these products can impart undesirable color and can adversely affect theological properties. Furthermore, many hydrocarbon resin tackifiers do not have acceptable FDA clearance for the desired applications. These and other advantages are realized with the two-component adhesive blends of the present invention which are described in more detail to follow.

SUMMARY OF THE INVENTION

The present invention relates to improved extrudable adhesive blends for adhering 4-methylpentene-1 polymers and vinyl alcohol polymers. In their most general terms, the adhesive blends of the invention are comprised of (a) 89 to 98 weight percent of an ethylene-lower alkyl acrylate copolymer and (b) 2 to 11 weight percent of a modified propylene polymer having greater than 50 weight percent propylene units and grafted with an ethylenically unsaturated carboxylic acid or derivative comonomer. More specifically, the blends contain 90 to 97 weight percent of a copolymer of ethylene with 5 to 45 weight percent $C_{1-6}$ alkyl ester of acrylic or methacrylic acid having a melt index of 0.3 to 125 g/10 min. and 3 to 10 weight percent of a copolymer of propylene and ethylene selected from the group consisting of statistical propylene-ethylene copolymers containing from about 1 to 10 weight percent ethylene and having a melt flow rate less than 15 g/10 min. and impact propylene-ethylene copolymers containing from 5 to 30 weight percent ethylene and having a melt flow rate less than 15 g/10 min. grafted with 1 to 6 weight percent ethylenically unsaturated carboxylic acid or derivative comonomer. Preferably (a) is copolymer of ethylene and n-butyl acrylate and (b) is modified propylene copolymers are produced by melt grafting maleic anhydride onto the statistical propylene-ethylene copolymer or impact propylene-ethylene copolymer.

There are also provided laminates having a base resin layer of crystalline 4-methylpentene-1 homopolymer or copolymer adhered to a barrier resin layer of an ethylene-vinyl alcohol copolymer using an interlayer of the above-described adhesive blends. In a preferred embodiment a paperboard layer is incorporated in the laminate structure which may contain additional base resin and adhesive layers. The laminates may additionally contain one or more layers including paperboard and other resins.

DETAILED DESCRIPTION OF THE INVENTION

According to the invention, highly useful two-component adhesive blends comprising a major proportion of an ethylene-alkyl acrylate copolymer with a minor amount of a modified propylene polymer are provided. The two-component blends are effective adhesive interlayers (tie layers) for bonding a PMP layer to an EVOH layer. The adhesive blends exhibit strong interfacial adhesion to both the PMP substrate and the EVOH substrate.

Copolymers which can be utilized as the major constituent in the adhesive blends are any of the conventional products obtained by copolymerizing ethylene with one or more lower alkyl acrylate monomers. Such copolymerizations are well known in the prior art and are generally carried out at pressures up to about 15,000 psi and temperatures from 150° C. to 250° C. in the presence of a suitable catalyst. A typical process for copolymerizing ethylene and lower alkyl acrylates is described in U.S. Pat. No. 2,200,429.

As employed herein, the term alkyl acrylate encompasses $C_{1-6}$ alkyl esters of both acrylic and methacrylic acid. In a highly useful embodiment, the acrylate comonomer copolymerized with the ethylene is a $C_{2-4}$ alkyl acrylate or methacrylate. Copolymers of ethylene with n-butyl acrylate, referred to herein as EnBA copolymers, are particularly advantageous.

The ethylene-alkyl acrylate copolymers will generally contain 5 to 45 weight percent alkyl acrylate. In a highly useful embodiment the copolymer will have from about 10 to 35 weight percent $C_{2-4}$ alkyl acrylate or methacrylate, and more preferably n-butyl acrylate, copolymerized. The melt index of these copolymers can range from fractional values up to about 400 g/10 min. or above. For extrusion coating and lamination, however, the melt index is most typically in the range from 0.3 up to about 125, and more preferably, from 0.5 up to about 50. All melt indexes referred to herein are determined at 190° C. in accordance with ASTM D 1238, condition E, and are expressed in grams per 10 minutes.

Illustrative resins within the preferred class of EnBA copolymers found to be highly advantageous for preparation of coextrudable adhesive blends useful as an interlayer between PMP and EVOH layers to useful laminate structures in accordance with the invention are the following:

| Wt. % nBA | 5 | 19 | 20 |
|---|---|---|---|
| Melt Index | 3 | 0.3 | 6 |
| Density (g/cm³) | 0.922 | 0.922 | 0.925 |
| Shore A Hardness | 97.5 | 90 | 89.5 |
| Vicat Softening point (°F.) | 190 | 149 | 143 |

For preparation of the adhesive blends, the above described ethylene-alkyl acrylate copolymers are employed in an amount ranging from about 89 up to about 98% by weight. More preferably, and particularly when the copolymer is EnBA, the ethylene-alkyl acrylate copolymer comprises from 90 to 97% by weight of the blend. The modified propylene polymer comprises the balance of the adhesive blend. In other words, the modified propylene polymer will be present in the adhesive blend from about 2 to 11% by weight and, more preferably, from 3 to 10% by weight.

Modified propylene polymers useful for formulation of the adhesive blends of the invention are propylene polymers comprised predominantly of propylene units and grafted with at least about 1 weight percent of an ethylenically unsaturated carboxylic acid or derivative. The weight percentage of graft comonomer is based on the weight of the grafted propylene polymer.

The modified, i.e., grafted, propylene polymers have melt flow rates greater than that of propylene polymer before grafting. The melt flow rate of the modified propylene polymer is generally 700 g/10 min or less and, more usually, about 500 g/10 min or less. Most preferably, the melt flow rate of the grafted propylene polymer will be in the range from 200 to 400 g/10 min. Melt flow rates (to be distinguished from melt indexes) are determined in accordance with ASTM D-1238, Condition L (230° C., 2160 g, 0.0825 in. capillary).

The propylene polymer which is grafted contains greater than 50 wt. %, and more typically at least about 75 wt. %, propylene units. Whereas α-olefins having from 2 up to about 8 carbon atoms can be polymerized with the propylene, preferably the copolymer will be a statistical (random) propylene-ethylene copolymer or impact ethylene-propylene copolymer. Melt flow rates of these copolymers (before grafting) will generally be less than 15 g/10 min and, more typically, will be in the range of about 0.01 to about 12 g/10 min.

Statistical propylene-ethylene copolymers, also referred to as random copolymers, which can be grafted to obtain the modified propylene copolymer component of the adhesive blend contain from about 1 to about 10 wt. % and, more preferably, from about 1 to about 6 wt. % ethylene. When a statistical copolymer having an ungrafted melt flow rate of about 1 to about 3 g/10 min. is grafted with about 0.5 to about 6 wt. % and, more preferably, about 1.0 to about 4 wt. % of the grafting comonomer, the melt flow rate of the resulting grafted product will generally be 700 g/10 min. or less. More usually, the melt flow rates of such grafted random propylene-ethylene copolymers will range from about 200 to about 500 g/10 min.

Impact propylene-ethylene copolymers which can be grafted to produce modified propylene copolymers useful for the adhesive blends are preferably reactor-made intimate mixtures of propylene homopolymers and statistically-oriented copolymers of propylene and ethylene and contain from 5 up to about 30 wt. % and, more preferably, from 6 to about 16 wt. % ethylene. Such intimate polymer mixtures are generally produced using multi-stage polymerization processes wherein, in a first, stirred reaction vessel, gaseous propylene is contacted with a polymerization catalyst, preferably of the titanium-ester coordination complex type, and an aluminum alkyl to produce a propylene homopolymer. In a second stage stirred reactor, propylene and ethylene are then copolymerized in intimate admixture with the polymer formed in the first stage. Suitable impact copolymers may, however, be obtained using conventional blending procedures.

Most preferably, the impact copolymer before grafting comprises about 11 to about 15 wt. % ethylene and has a melt flow rate in the range of about 0.4 to about 1.5 g/10 min. Such impact copolymers are generally defined as having Gardner Impact values in the range of 125–240 in. lbs., as measured at −18° C. according to ASTM D3029, method "G." Impact copolymers having ethylene contents greater than about 12 wt. % are sometimes referred to in the art as "thermoplastic olefins" ("TPOs") or "thermoplastic olefinic elastomers" ("TPOEs"), and can be used to obtain useful modified propylene polymer components for the adhesive blends.

With an impact copolymer having an initial MFR of about 0.4 to about 1.5 g/10 min. and grafted with about 0.5 to about 6 wt. % and, more preferably, about 1.0 to about 4 wt. % graft comonomer, the melt flow rate of the resulting grafted product will typically be about 700 g/10 min. or less and, more generally, in the range of about 200 to about 450 g/10 min.

The grafting comonomer is at least one polymerizable, ethylenically unsaturated carboxylic acid or acid derivative, such as an acid anhydride, ester, salt, amide, imide, or the like. Such monomers include but are not limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3diketospiro(4.4)non-7-ene, bicyclo(2.2.1)hept-5-ene-2,3-dicarboxylic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride (XMNA). Maleic anhydride is a preferred grafting comonomer.

As used herein, the term "grafting" denotes covalent bonding of the grafting comonomer to the polymer chain of the propylene polymer. The grafted propylene polymer component may be prepared in solution, in a fluidized bed reactor, or by melt grafting. Particularly useful modified products are conveniently prepared by melt blending the propylene polymer, in the substantial absence of a solvent, with a free radical generating catalyst, such as a peroxide, and the grafting comonomer using a shear-imparting reactor, such as an extruder reactor. Twin screw extruders, such as those marketed by Werner-Pfleiderer, are especially useful for melt grafting. Since substantial amounts of solvent are to be avoided, the catalyst and graft monomer are preferably added directly to the reactor.

Specific examples of useful peroxide catalysts include:

1,1-bis(tert-butylperoxy)cyclohexane,
n-butyl-4,4-bis(tert-butylperoxy)valerate,
1,1-bis(tert-butylperoxy)-3,3,5-trimethylcyclohexane,
2,2-bis(tert-butylperoxy)butane,
dicumylperoxide,
tert-butylcumylperoxide,
a,a'-bis(tert-butyperoxyisopropyl)benzene,
di-tert-butylperoxide (DTBP),
2,5-dimethyl-2,5-di-(tert-butylperoxy)hexane, and the like.

The graft reaction is carried at a temperature above the decomposition temperature of the free radical generating catalyst; however, excessive temperatures should be avoided to minimize or avoid rapid vaporization and consequent losses of the catalyst and graft comonomer. A temperature profile where the temperature of the polymer melt is increased over the length of the extruder up to a maximum in the reaction zone and then decreases toward the extruder output is preferred. Temperature attenuation facilitates processing of the resulting modified product for pelletization or the like. When using maleic anhydride and di-tert-butyl peroxide, a preferred free radical initiator, operating temperatures within the extruder generally range from 190° C. up to 215° C.

For the preferred adhesive blends, the propylene copolymer is grafted with maleic anhydride at a concentration in the range of about 1.5 to 4 wt. % such that the MFR of the grafted product is 500 g/10 min. or below. In a highly preferred embodiment of the invention, the modified propylene polymer component of the adhesive blends is an impact copolymer having an ethylene content of about 11 to about 15 wt. % and melt flow rate in the range of about 0.8 to about 1.5 g/10 min. grafted with about 1.5 wt. % to about 4 wt. % maleic anhydride such that the MFR of the grafted product is in the range of about 200 to about 400 g/10 min.

The adhesive blends of the invention are prepared by melt compounding the ethylene-alkyl acrylate copolymer and modified propylene polymer with conventional additives such as antioxidants and the like. The adhesive blends may be used directly as obtained from the melt compounding operation or, as is more commonly the case, the products may be stored for subsequent use. When the product is to be retained, it is typically pelletized or put in another form suitable for handling.

The adhesive blends are used as tie layers in multilayer structures to bond a PMP layer to a vinyl alcohol barrier polymer layer. Useful multilayer structures have at least one PMP layer, an interlayer of the adhesive blend and a barrier layer of a vinyl alcohol polymer, preferably EVOH.

The PMP may be a homopolymer of 4-methyl-1-pentene or a copolymer of 4-methyl-1-pentene with another α-olefin having from 2 to 20 and, more preferably, from 5 to 10 carbon atoms. Illustrative α-olefins include ethylene, propylene, 1-butene, 1-pentene, 1-hexene, 1-octene, 1-decene, and 1-octadecene. Copolymers preferably contain at least 85 mole % of the 4-methyl-1-pentene and copolymers containing 5–10% 1-pentene or 1-hexene are particularly advantageous since the crystallinity and melting point of these products are very similar to that of PMP homopolymer. Crystalline PMP homopolymers and copolymers suitable for processing into films and sheets in accordance with the invention are commercially available. It is especially useful for coextrusion, that the melt flow rate of the polymer be from about 1 to 200 and, more preferably, from 2 to 100 g/10 min. Melt flow rates for PMP are determined at 260° C. using a 5 kg. weight.

Vinyl alcohol polymers which can be utilized as the barrier layer are the saponified or hydrolyzed product of an ethylene-vinyl acetate copolymer. Highly useful EVOH copolymers of this type, recognized for their superior barrier properties, typically contain from about 25 to 85 mol %, and more preferably, 20 to 50 mol % ethylene. In general, the degree of hydrolysis of these products is at least 96% and, most commonly, 99% or above. Numerous EVOH barrier resins suitable for coextrusion and lamination are available from commercial sources.

Highly useful multi-layer structures produced using the adhesive blends of the invention comprise a PMP layer bonded to a vinyl alcohol polymer barrier layer by means of an interlayer of the adhesive blend. These constructions can be graphically represented as PMP/tie/barrier. Preferably the barrier layer is EVOH. Paperboard based constructions having such multilayer combinations coated thereon, i.e., paperboard/PMP/tie/barrier, are particularly advantageous. The PMP layer imparts a degree of resistance to warpage to the paperboard substrate. Structures of this general type have been disclosed in U.S. Pat. No. 5,002,833. Barrier layers disclosed in U.S. Pat. No. 5,002,833 were, however, limited to polyamides, copolyamides, polyesters and copolyesters due to the unsuitability of the adhesives used to bond PMP and EVOH.

In a particularly useful embodiment of the invention, a five-layer coextrusion is applied to paperboard. The five-layer coating coextruded onto the paperboard has a PMP layer in contact with the paperboard, an interlayer of the adhesive blend, an EVOH barrier layer, another interlayer of adhesive blend, and a final layer of PMP. Such constructions are graphically depicted paperboard/PMP/tie/EVOH/tie/PMP. The exterior PMP layer imparts good grease and oil resistance to these constructions and also exhibits superior food release properties rendering such laminates highly useful for the construction of formed ovenable food containers.

In addition to the foregoing, composite multi-layer structures of the type paperboard/tie/EVOH/tie/PMP can be produced with the adhesive blends of the invention. An additional layer of suitable polyolefin resin (including PMP) may also be applied to the outside of the paperboard layer. It is generally not necessary to use a tie layer when applying an outer polyolefin layer to the paperboard in which case the six-layer structure would be polyolefin/paperboard/tie/EVOH/tie/PMp. The choice of the polyolefin will depend on the intended application and can include resins such as low density polyethylene and the like. For constructions which are to be exposed to food cooking temperatures, a high melting polyolefin resin, such as homopolymers and copolymers of 4MP1, would preferably be employed. A preferred construction of this type would be PMP/paperboard/tie/EVOH/tie/PMP.

For coextruding structures of the above types, it will be recognized by those skilled in the art that the viscosities of the materials used for the various layers should be matched to minimize uneven distribution of the layers. By controlling processing conditions and using materials with compatible melt flow rates, flow disturbances which can cause discontinuities and waviness can be minimized and, in most cases, completely eliminated.

EXAMPLES

The following examples illustrate the adhesive blends of the invention more fully and demonstrate the improved results obtained therewith. In these examples all percentages are on a weight basis unless otherwise indicated. Melt indexes and melt flow rates identified for the various polymers were determined in accordance with the previously referenced procedures.

Four adhesive blends (A-D) were prepared using an EnBA copolymer containing 20% nBA and having a melt index of 60 and a maleic anhydride modified propylene polymer. The propylene polymer was an impact copolymer of the so-called reactor-made intimate mixture type produced in a multi-stage polymerization process wherein, in a first stirred reactor, propylene was homopolymerized and, in a second stirred reactor, propylene and ethylene were copolymerized in intimate admixture with the polypropylene produced in the first stage. The impact copolymer, which contained 12% ethylene and had a melt flow rate of about 350 g/10 min., was grafted with 2% maleic anhydride. Compositions of the four adhesive blends were as follows:

|  | BLEND | | | |
|---|---|---|---|---|
|  | A | B | C | D |
| EnBA (%) | 90 | 94 | 96 | 97 |

-continued

|  | BLEND | | | |
|---|---|---|---|---|
|  | A | B | C | D |
| Grafted Impact Copolymer (%) | 10 | 6 | 4 | 3 |

The adhesive blends were prepared by mixing the EnBA and grafted impact copolymer in a Brabender mixer equipped with a 40 gram mixing head and twin rotors. Operating conditions were as follows:

| Temperature: | 293° C. |
|---|---|
| Rotor Speed: | 100 rpm |
| Mixing Time: | 5 minutes |

Nitrogen was maintained over the mixture during blending to minimize oxidation. At the conclusion of the mixing period, each adhesive blend was transferred to a mold and pressed at 204° F. into a film of 5-6 mils thickness.

Each of the films produced with adhesive blends A-D was heat sealed to EVOH film and PMP film and the adhesion, i.e., determined in accordance with ASTM D 1876. The EVOH and PMP films used for the heat seal were of comparable thickness, i.e., 5-6 mils, and pressed from a commercially available EVOH copolymer (EVAL ® F-101 having a melt index of 1.5 g/10 min. and containing 32 mol % ethylene) and a commercially available PMP copolymer (CRYSTALOR ™ CBN-005 having a melt flow rate of 5 g/10 min. and melting point of 235° C.). PMP copolymer films were pressed at 270° C. whereas the EVOH films were pressed at 204° C. Heat sealing was carried out using a Sentinel heat sealer operated at 40 psi, 260° C., and 3 sec. dwell time.

Results obtained with each of the adhesive blends A-D and EVOH were as follows:

|  | Heat Seal Strength (lbs/in) |
|---|---|
| Adhesive Blend A | 4.7 |
| Adhesive Blend B | 4.3 |
| Adhesive Blend C | 3.4 |
| Adhesive Blend D | 4.1 |

Results of the heat seal to PMP for each of the blends A-D were as follows.

|  | Heat Seal Strength (lbs/in) |
|---|---|
| Adhesive Blend A | 2.0 |
| Adhesive Blend B | 3.2 |
| Adhesive Blend C | 3.3 |
| Adhesive Blend D | 3.0 |

It is apparent from the above data that acceptable heat seals to both EVOH and PMP are obtained with adhesive blends A-D. The significance of the above data is even more striking when one considers results obtained with certain comparative formulations melt blended in accordance with the previously described procedure. For example, the criticality of the amount of the modified propylene polymer present in the adhesive blend is apparent from the results obtained using a blend comprised of 14% of the above-described maleic anhydride graft and 86% of the above-described EnBA copolymer. While the heat seal strength to EVOH obtained with this blend was 3 lbs./in., the heat seal strength to the PMP was only 0.1 lb/in.

The criticality of the components comprising the adhesive blends is also evident from comparative results obtained using blends formulated using other resins or graft polymers. To illustrate this point, a blend of 6% of the above-described grafted propylene-ethylene copolymer and 94% commercially available polypropylene impact copolymer (PETROTHENE® PP-8752HF) was prepared and evaluated for heat sealability to the EVOH and PMP. The heat seal strength to EVOH was 2.8 lbs/in. but only 0.1 lbs/in. with PMP. A blend of 10% of the grafted propylene-ethylene impact copolymer with 90% PMP homopolymer (CRYSTALOR ™ HBN-005) had a heat seal strength of 0.6 lbs/in. PMP and 0 lbs/in. to EVOH. By replacing a portion (about 28%) of the PMP in the latter formulation with an EPR rubber (Vistalon ® 404) the heat seal strengths to EVOH and PMP were increased to 0.6 and 1.35 lbs/in., respectively. These results are still considered to be unacceptable. It is generally considered that heat seals of at least 2 lbs/in. are necessary for most laminates and it is even more preferred that the heat seal values be 3 lbs/in. or greater.

Multi-layer sheet and film comprised of a layer of EVOH, a layer of PMP homopolymer and an interlayer of the adhesive blend sandwiched between are produced on a Killion coextrusion line. The three 1-inch single screw extruders employed to process and extrude each of the ingredients are operated as follows:

| | |
|---|---|
| PMP: | 510–600° F. at 60 rpm |
| EVOH: | 400–420° F. at 20 rpm |
| Adhesive Blend: | 440–460° F. at 20 rpm. |

An 8 inch die is used and melt temperatures are adjusted as necessary to match flow viscosities for satisfactory film production. Extruder speeds are adjusted to achieve the desired layer thickness. A take-up speed of about 2 ft/min. is employed when producing sheet and, when film is produced, the take-up speed is about 15 ft/min.

We claim:

1. An adhesive blend consisting essentially of (a) 89 to 98 weight percent of an ethylene-$C_{1-6}$ alkyl acrylate copolymer having a melt index of 0.3 to 125 g/10 min and (b) 2 to 11 weight percent of a copolymer of propylene and ethylene selected from the group consisting of statistical propylene-ethylene copolymers containing from about 1 to 10 weight percent ethylene and having a melt flow rate less than 15 g/10 min and impact propylene-ethylene copolymers containing from 5 to 30 weight percent ethylene and having a melt flow rate less than 15 g/10 min and grafted with 1 to 6 weight percent of an ethylenically unsaturated carboxylic acid or derivative thereof.

2. The adhesive blend of claim 1 wherein (a) is a copolymer of ethylene and 5 to 45 weight percent of a $C_{1-6}$ alkyl ester of acrylic or methacrylic acid.

3. The adhesive blend of claim 2 wherein the graft comonomer is maleic anhydride.

4. The adhesive blend of claim 3 where (b) is produced by melt grafting maleic anhydride onto the propylene-ethylene copolymer in the substantial absence of solvent with a free radical generating catalyst in a shear-imparting reactor.

5. The adhesive blend of claim 2 wherein (a) is a copolymer of ethylene and n-butyl acrylate.

6. The adhesive blend of claim 2 comprised of 90 to 97 weight percent (a) and 3 to 10 weight percent (b) and wherein (a) is a copolymer of ethylene with 10 to 35 weight percent $C_{2-4}$ alkyl acrylate having a melt index from 0.3 to 125 g/10 min.

7. The adhesive blend of claim 6 wherein (a) is a copolymer of ethylene and n-butyl acrylate having a melt index from 0.5 to 50 g/10 min.

8. The adhesive blend of claim 6 wherein (b) is a statistical copolymer of propylene and 1 to 6 weight percent ethylene grafted with 1.5 to 4 weight percent maleic anhydride and having a melt flow rate from about 200 to 500 g/10 min.

9. The adhesive blend of claim 8 wherein (b) is obtained by melt grafting maleic anhydride onto a statistical copolymer of propylene and ethylene having a melt flow rate of 1 to 3 g/10 min. in the substantial absence of solvent with a free radical generating catalyst in a shear-imparting reactor.

10. The adhesive blend of claim 6 wherein (b) is an impact copolymer of propylene and 6 to 16 weight percent ethylene grafted with 1.5 to about 4 weight percent maleic anhydride and having a melt flow rate in the range of 200 to 450 g/10 min.

11. The adhesive blend of claim 10 wherein (b) is produced by melt grafting maleic anhydride onto an impact copolymer having a melt flow rate in the range of 0.4 to 1.5 g/10 min. in the substantial absence of solvent with a free radical generating catalyst in a shear-imparting reactor.

12. The adhesive blend of claim 6 wherein (b) is an impact copolymer of propylene and 11 to 15 weight percent ethylene grafted with 1.5 to 4 weight percent maleic anhydride and having a melt flow rate in the range of 200 to 400 g/10 min.

13. The adhesive blend of claim 12 wherein (b) is produced by melt grafting maleic anhydride onto an impact copolymer having a melt flow rate in the range of 0.4 to 1.5 g/10 min. in the substantial absence of solvent with a free radical generating catalyst in a shear-imparting reactor.

* * * * *